United States Patent Office 3,759,780
Patented Sept. 18, 1973

3,759,780
PROCESS OF SEALING JOINTS WITH
SEALANT COMPOSITION
Alexander J. Rizzer, Akron, Ohio, assignor to Cities
Service Company, New York, N.Y.
No Drawing. Original application Jan. 21, 1970, Ser. No. 4,784, now abandoned. Divided and this application July 9, 1971, Ser. No. 161,942
Int. Cl. C09j 3/12
U.S. Cl. 156—335                          1 Claim

ABSTRACT OF THE DISCLOSURE

Tapes for sealing windows in automotive and architectural applications are formulated from butyl rubber, a rubber plasticizer, carbon black and a thermoplastic terpene phenol-formaldehyde Novolak resin. By virtue of the terpene phenolic resin, the sag and heat flow resistance of the formulation is considerably enhanced.

BACKGROUND OF THE INVENTION

This application is a division of United States application Ser. No. 4,784 filed Jan. 21, 1970 now abandoned, and assigned to the same assignee as this application.

This invention relates to the compounding of rubber and more particularly relates to the formulation of sealant compositions which contain butyl rubber as the base elastomer. Sealants are generally of two classes, i.e. hand or gun applied caulks and preformed tapes or strips.

For the sealing of windows, e.g. automobile windshields, a tape having a desired size and shape is formed by the extrusion of a pliant, unvulcanized sealant composition, and this is then applied to the joint between the windshield and the frame of an automobile. The tape must be stiff enough to remain in place after the seal is made, but not so stiff as to complicate the application thereof or to prevent the formation of a good adhesive bond with the glass and metal substrates. Butyl rubber is particularly desirable as a base in an elastomeric sealant composition because of its excellent resistance to weathering, but in the past it has been very difficult to form a tape from this rubber which is characterized by ease of application and good bonding strength while retaining its self-supporting properties. Flow, particularly, has been a problem, i.e. if the tape stock is compounded soft enough to provide both ease of application and good bondability to the substrates, the tape may sag out of shape and/or flow out of place after the tape is installed.

Reduction in the flow of butyl tapes has heretofore been accomplished by use of a vulcanizing agent which is inactive in the presence of a solvent that is included in the sealant composition, and whereupon evaporation of the solvent the rubber slowly cures at temperatures in excess about 100° F. The tape is thus applied "green" for curing in service on the vehicle, being pliant enough for easy application to the structural joint and becoming stiffer as the rubber cures. The trouble with this method is that use of a solvent requires additional expense, special processing techniques and more stringent safety precautions. Furthermore, evaporation of the solvent can be too slow and the sealant may sag or flow out of place before the rubber can cure.

SUMMARY OF THE INVENTION

The present invention amounts to the discovery that butyl rubber sealant compositions, which are characterized by excellent resistance to sag and flow, can be produced by the inclusion of carbon black and a thermoplastic terpene phenol-formaldehyde Novolak resin into the butyl rubber. A rubber plasticizer is also included for the purpose of extrusion and to reduce the viscosity of the composition.

Thermoplastic terpene phenol-formaldehyde Novolak resins can be produced by first alkylating phenol with a terpene, e.g. alpha-pinene, and then condensing the terpene phenol with formaldehyde. In the final processing step the resulting resin is vacuum stripped at a temperature above the boiling point of water, allowing a trace of free methylol to remain in the resin, and thus producing a thermoplastic Novolak type of resin as opposed to a heat hardenable resole type.

It is generally known that butyl rubber can be vulcanized by means of dimethylol phenol resins, but the cure requires several hours at conventional vulcanization temperatures, e.g. 300–375° F. It must be emphasized, however, that in accordance with the present invention the desired resistance to sag and heat flow of the sealant composition is obtained by means of the aforementioned terpene phenolic resin without result to the usual conditions of vulcanization.

Thus, the precise effect which results in stiffening and improved heat flow of the butyl tape composition is not known. Since the properties of a phenolic resin depends greatly upon the structure of the phenol used in making the resin, it is conjectured that thermoplastic terpene phenol-formaldehyde Novolak resins which have a trace of free methylol provide a synergistic reaction in the presence of carbon black to effect improvement in the flow resistance of the rubber. Such an effect would not have been heretofore expected since such resins are marketed as plasticizers and extenders for rubber, and as such would have been expected to increase the flow of a rubber.

The proportion of ingredients formulated into the sealant compositions of this invention is subject to considerable variation and will depend upon the precise performance characteristics desired. In general, the proportion of ingredients can be 100 parts by weight of butyl rubber, from about 40 to about 200 parts by weight of carbon black, from about 50 to about 200 parts by weight of rubber plasticizer and from about 5 to about 30 parts by weight of terpene phenolic resin. To advantage, the composition can contain about 70 to about 150 parts by weight of carbon black and from about 70 to about 150 parts by weight of rubber plasticizer.

Rubber plasticizers that can be employed in the practice of the invention include paraffinic extender and tackifier oils, low molecular weight polybutenes, and mixtures thereof.

Mixing of the ingredients of the compositions can be accomplished in a conventional manner, e.g. in a Banbury or Baker-Perkins mixer at temperatures of from about 150° F. to about 350° F. Being unvulcanized, the resultant mixture is plastic in the sense that it is soft enough to be easily molded into a desired shape, yet is capable of hardening into a desired fixed form. Thus, the unvulcanized composition can be employed directly after formation for the sealing of a joint, either by hand or gun application or after the composition has been molded into a tape or strip by extrusion.

DESCRIPTION OF PREFERRED EMBODIMENTS

| Formulations | Parts by weight, mixed in Banbury at 180° F. | | | |
|---|---|---|---|---|
| | 1 | 2 | 3 | 4 |
| Bucar 500-NS®[1] | 100 | 100 | 100 | 100 |
| Statex M®[2] | 150 | 150 | 150 | 150 |
| Sun Par 2100®[3] | 70 | 70 | 70 | 70 |
| Indopol H-100®[4] | 70 | 70 | 70 | 70 |
| Camel Carb®[5] | 35 | 35 | 35 | 35 |
| Stearic acid | 2 | 2 | 2 | 2 |
| NTP-90®[6] | | 5 | 10 | 20 |

[1] Butyl rubber, Columbian Carbon Company.
[2] FFF carbon black, Columbian Carbon Company.
[3] Paraffinic extender oil, Sun Oil Company.
[4] Polybutene, Amoco Chemicals Co.
[5] Dry ground calcium carbonate filler, Henry T. Cambell Sons' Corp.
[6] Thermoplastic terpene phenol-formaldehyde Novolak resin containing a trace of free methylol—Pennsylvania Industrial Chem. Co.

TESTS RESULTS

| | 1 | 2 | 3 | 4 |
|---|---|---|---|---|
| Compression (p.c.i.) | 102 | 111 | 127 | 130 |
| Yield strength (p.s.i.) | 9.6 | 10.4 | 12.3 | 10.7 |
| 5' rebound, inch | 0.205 | 0.206 | 0.205 | 0.211 |
| Heat flow test, height in inches 24 hours at 190° F | 0.208 | 0.221 | 0.229 | 0.241 |
| Horizontal heat sag ($\frac{1}{32}''$) 24 hours at 190° F | 0 | 0 | 0 | 0 |

TEST PROCEDURES

Compression (p.c.i.).—Two specimens of tape 3" long x ⅜" square are placed one inch apart between two glass plates having dimensions of 3" x 3" x ¼". This assembly is compressed in an Instron Tester at a speed of 2 inches per minute until the distance between the plates is 0.200 inches. The pounds of pressure required to achieve this degree of compression is then converted to pounds per cubic inch based on the volume of the tape specimens. Testing is done at 75° F. This test provides one indication of ease of application. Compression values of about 80 to about 130 p.c.i. are desirable.

Yield (p.s.i.).—Using the same assembly as for compression and rebound, the glass plates are pulled apart in the Instron machine at the rate of 1 inch per minute (75° F.) to failure of either the cohesive or adhesive bond. Pounds of pull required to effect this separation is converted to pounds per square inch based on the original average cross-sectional area of the tape specimens. A test value of at least 7.5 p.s.i. is desirable. This test measures the cohesive strength of the tape.

5" rebound, in.—Using the same assembly as was employed for the compression test, distance between the glass plates is measured 5 minutes after the pressure is released. Testing is conducted at 75° F. This distance should not exceed 0.250, for otherwise the recovery of the tape from deformation may be so great as to cause mechanical problems after installation.

Heat flow test.—An assembly as is used in the compression test is made up and is compressed to a thickness of 0.200 and held there for one minute. (Spacers are used to prevent overcompression.) Compression is released, the spacers are removed, and the assembly is then subjected to the compression of a 1½ lb. weight. After 24 hours at 190° F., the assembly is allowed to cool to room temperature for one hour and the distance between the plates is then measured. The distance between the plates should not be less than 0.200, the original thickness.

Horizontal heat sag ($\frac{1}{32}''$ at 190° F.).—A 3" long specimen of ⅜" square tape is adhered to a metal panel and the panel is then suspended vertically in a heated oven with the 3" dimension of the tape in the horizontal plane. Heat sag is measured at the top outermost edge of the specimen. Sag should not exceed $\frac{1}{32}''$.

REMARKS

While it will be apparent that each of the Compositions 1-4 passed all of the tests, the heat flow imparted to Compositions 2-4 should be noted. These values represent outstanding resistance to heat flow, and it can be seen that equivalent values were not obtained in the absence of the terpene phenolic resin (Composition 1).

While the present invention has been described with reference to particular materials, formulations, process conditions and the like, it wil be understood that still others may be employed without departing from the spirit and scope of the invention as expressed in the appended claim.

Therefore, what is claimed is:

1. In a process for sealing a structural joint with a sealant composition comprising butyl rubber, carbon black and a rubber plasticizer, the method for producing a sealed joint wherein the sealant composition is resistant to sag and heat flow which comprises applying to the joint a sealant composition that contains 100 parts by weight of the butyl rubber, about 70 to about 150 parts by weight of the carbon black, from about 70 to about 150 parts by weight of the rubber plasticizer, and from about 5 to about 20 parts by weight of a thermoplastic terpene phenol-formaldehyde novolak resin which contains free methylol that remains therein after a stripping of the resin subsequent to the condensation thereof.

References Cited
UNITED STATES PATENTS

| 3,654,005 | 4/1972 | Higgins et al. | 156—335 X |
| 3,331,804 | 7/1967 | Fogiel | 156—335 X |
| 3,645,817 | 2/1972 | Walker et al. | 161—203 X |
| 3,652,380 | 3/1972 | Strack | 161—203 X |

WILLIAM A. POWELL, Primary Examiner

U.S. Cl. X.R.
161—192, 213